(12) United States Patent
Satake et al.

(10) Patent No.: US 10,190,807 B2
(45) Date of Patent: Jan. 29, 2019

(54) EXPANSION VALVE

(71) Applicant: TGK CO., LTD., Tokyo (JP)

(72) Inventors: Ryosuke Satake, Tokyo (JP); Takeshi Watanabe, Tokyo (JP); Takanao Kumakura, Tokyo (JP); Yuta Iwamoto, Tokyo (JP)

(73) Assignee: TGK CO., LTD., Tokyo (JP)

( * ) Notice: Subject to any disclaimer, the term of this patent is extended or adjusted under 35 U.S.C. 154(b) by 18 days.

(21) Appl. No.: 15/380,189

(22) Filed: Dec. 15, 2016

(65) Prior Publication Data
US 2017/0176067 A1    Jun. 22, 2017

(30) Foreign Application Priority Data

Dec. 21, 2015 (JP) .................................. 2015-248601
Oct. 14, 2016 (JP) .................................. 2016-202453

(51) Int. Cl.
*F25B 41/06* (2006.01)
*F16K 1/14* (2006.01)
(Continued)

(52) U.S. Cl.
CPC .............. *F25B 41/062* (2013.01); *F16K 1/14* (2013.01); *F16K 27/0245* (2013.01);
(Continued)

(58) Field of Classification Search
CPC ...... F25B 41/062; F25B 2341/06; F16K 1/14; F16K 24/0245; F16K 31/002; F16F 1/324; G05D 16/2013
(Continued)

(56) References Cited

U.S. PATENT DOCUMENTS 4,959,973 A * 10/1990 Tanaka .................. F25B 41/062
236/92 B
6,889,909 B2 * 5/2005 Kobayashi ............ F25B 41/062
236/92 B
(Continued)

FOREIGN PATENT DOCUMENTS

CN     103363735 A     10/2013
JP     2011-245549 A   12/2011
(Continued)

OTHER PUBLICATIONS

"Machine Translation of JP 2012-047393 A, Yasushi, Mar. 2012."*

*Primary Examiner* — Frantz Jules
*Assistant Examiner* — Martha Tadesse
(74) *Attorney, Agent, or Firm* — Muncy, Geissler, Olds & Lowe, P.C.

(57) ABSTRACT

A downstream-side passage of an expansion valve includes a small-diameter part to which a valve hole and an insertion hole are open, and a large-diameter part to which a pipe leading to an evaporator is connected. A plate has a shield part partially covering a downstream end of the small-diameter part. The shield part has a height of 2 mm or larger in a radial direction of the small-diameter part from a projected position of an opening of the insertion hole at the downstream end of the small-diameter part, and a width equal to or larger than a radius of the shaft within a range of the height. The plate is provided so that the shield part does not cover at least a range of projection of an opening of the valve hole at the downstream end of the small-diameter part.

20 Claims, 12 Drawing Sheets

(51) Int. Cl.
*F16K 27/02* (2006.01)
*F16K 31/00* (2006.01)

(52) U.S. Cl.
CPC .... *F16K 31/002* (2013.01); *F25B 2341/0683* (2013.01); *F25B 2500/12* (2013.01)

(58) Field of Classification Search
USPC .......................................................... 62/528
See application file for complete search history.

(56) References Cited

U.S. PATENT DOCUMENTS

| | | | |
|---|---|---|---|
| 9,702,601 B2 * | 7/2017 | Satake | F25B 41/062 |
| 2006/0196201 A1 * | 9/2006 | Sendo | B22D 17/007 |
| | | | 62/222 |
| 2011/0259968 A1 * | 10/2011 | Kumakura | B23P 11/005 |
| | | | 236/92 B |
| 2013/0283836 A1 * | 10/2013 | Satake | F25B 41/062 |
| | | | 62/225 |
| 2014/0261765 A1 * | 9/2014 | Satake | F25B 41/062 |
| | | | 137/340 |

FOREIGN PATENT DOCUMENTS

| | | | | |
|---|---|---|---|---|
| JP | 2012047393 A | * | 3/2012 | ............ F25B 41/062 |
| JP | 2013231571 A | * | 11/2013 | ............ F25B 41/062 |
| JP | 2014-238207 A | | 12/2014 | |

* cited by examiner

EXPANSION VALVE

CLAIM OF PRIORITY

This application claims priority to Japanese Patent Application No. 2015-248601 filed on Dec. 21, 2015 and Japanese Patent Application No. 2016-202453 filed on Oct. 14, 2016, which are incorporated herein by reference.

BACKGROUND OF THE INVENTION

1. Field of the Invention

The present invention relates to an expansion valve, and more particularly to an expansion valve suitable for use in a refrigeration cycle.

2. Description of the Related Art

A refrigeration cycle in an automotive air conditioner generally includes a compressor for compressing a circulating refrigerant, a condenser for condensing the compressed refrigerant, an expansion valve for throttling and expanding the condensed refrigerant and delivering the resulting spray of refrigerant, and an evaporator for cooling the air in a vehicle interior using evaporative latent heat of the refrigerant. The expansion valve controls the flow rate of the refrigerant delivered toward the evaporator so that the refrigerant having passed through the evaporator has a predetermined degree of superheat.

In such a refrigeration cycle, sufficient condensing may not be achieved during low-load operation, for example. This may result in a gas-liquid two-phase state of the high-pressure refrigerant flowing into the expansion valve, and cause a phenomenon of liquid refrigerant and gas refrigerant intermittently passing through a valve section. In this case, the liquid refrigerant (liquid phase), which has a relatively high density, flows less smoothly depending on the layout of piping connecting the evaporator and the expansion valve. As a result, liquid stagnation may occur at a particular position in the piping and a subsequent flow of refrigerant hitting the liquid stagnation may cause noise.

To address such circumstances, a structure in which a throttle passage downstream of a valve section of an expansion valve is proposed, for example (refer to Japanese Patent Application Publication No. 2011-245549, for example). Specifically, a plate having a small hole at the center is disposed in a downstream-side passage in the valve section. This structure is proposed to make bubbles of the refrigerant finer through two stages of pressure reduction by the valve section of the expansion valve and by the throttle passage, so as to reduce noise (breakage sound) caused by the bubbles breaking while the refrigerant passes through the liquid stagnation.

RELATED ART LIST (1) Japanese Patent Application Publication No. 2011-245549

Verification conducted by the inventors, however, has shown that provision of a throttle passage alone downstream of a valve section is not sufficient for reducing the aforementioned noise.

SUMMARY OF THE INVENTION

In view of the above and other circumstances, one purpose of an embodiment of the present invention is to reduce noise caused by a refrigerant passing through an expansion valve.

One embodiment of the present invention relates to an expansion valve provided in a refrigeration cycle and configured to throttling and expanding a refrigerant flowing into the expansion valve from upstream. The expansion valve includes: a body having an inlet port through which a refrigerant is introduced from an upstream side, an outlet port through which the refrigerant is delivered to a downstream side, a valve hole through which the inlet port and the outlet port communicate with each other, an insertion hole formed coaxially with the valve hole, and a downstream-side passage intersecting at right angle with the valve hole and the insertion hole and through which the valve hole and the outlet port communicate with each other; a valve element configured to move toward and away from the valve hole to close and open a valve section; a drive unit provided on the body and configured to generate a drive force for opening or closing the valve section; a shaft slidably extending through the insertion hole, having a first end connected to the drive unit and a second end connected to the valve element through the downstream-side passage and the valve hole, and being configured to transmit the drive force of the drive unit to the valve element; and a wall member provided in the downstream-side passage.

The downstream-side passage includes a small-diameter part to which the valve hole and the insertion hole are open, and a large-diameter part to which a pipe leading to the evaporator is connected. The wall member has a shield part partially covering a downstream end of the small-diameter part. The shield part has a height of 2 mm or larger in a radial direction of the small-diameter part from a projected position of an opening of the insertion hole at the downstream end of the small-diameter part and a width equal to or larger than a radius of the shaft within a range of the height. The shield part of the wall member does not cover at least a range of projection of an opening of the valve hole at the downstream end of the small-diameter part.

According to this embodiment, the wall member is provided in the downstream-side passage communicating with the valve hole, so as to cover the vicinity of the projected position of the insertion hole at the downstream end of the small-diameter part (the vicinity of a projected position of a base end of the shaft exposed to the downstream-passage from the insertion hole). As a result, even if the refrigerant having passed through the valve hole is in the gas-liquid two phase state, the extent to which masses of the liquid phase are delivered directly to pipes is suppressed. Specifically, while the liquid phase of the refrigerant having passed through the valve hole tends to flow along the shaft and changes the flowing direction near the insertion hole, and is delivered toward the downstream, the shield part disperse at least part of the liquid phase by reflecting the liquid phase, so that the liquid phase easily mix with a subsequent gas phase. This prevents or minimizes delivery of masses of the liquid phase, which intermittently flows, to the downstream without being dispersed. As a result, generation of noise (impact sound) caused by collision between liquid stagnation and the refrigerant in downstream pipes is prevented or minimize. As will be described in embodiments below, the setting of the range of the shield part to have at least a height of 2 mm or larger and a width equal to or larger than the diameter of the shaft produces good effects. Conversely, at least the projected range of the opening of the valve hole at the downstream end of the small-diameter part is not blocked, which prevents or minimizes stagnation of the liquid phase in a space between the wall member and the valve hole. Thus, generation of impact sound caused by collision of the liquid stagnation with subsequent refrigerant is prevented or minimized. According to this embodiment, generation of impact sound is prevented or minimized inside and outside of the expansion valve in this manner, and noise due to the refrigerant passing through the expansion valve is reduced.

Another embodiment of the present invention also relates to an expansion valve. The expansion valve includes a plate member, as the wall member, which partially blocks a cross section of the downstream-side passage. The downstream-side passage has an annular part at the boundary between the large-diameter part and the small-diameter part. The plate member has a shape in which the outer periphery of the plate member on a side opposite to the projected position of the valve hole is in contact with the annular part and in which the plate member is open on the side of the projected position of the valve hole. The outer periphery includes a part fixed to the annular part on the side of the projected position of the valve hole relative to the center of the annular part by the contact surface pressure in the radial direction.

According to this embodiment, since the plate member is provided, the vicinity of the projected position of the insertion hole at the downstream end of the small-diameter part is covered. This prevents or minimizes generation of noise caused by collision between the liquid stagnation with the refrigerant in downstream pipes. Furthermore, since the plate member has a shape being open toward the side of the projected position of the valve hole, stagnation of the liquid phase in a space between the plate member and the valve hole is prevented or minimized. Thus, generation of impact sound caused by collision of the liquid stagnation with subsequent refrigerant is prevented or minimized. Furthermore, since the plate member also has a fixed part on the side of the projected position of the valve hole relative to the center of the annular part, the plate member is stably mounted on the annular part.

DETAILED DESCRIPTION OF THE INVENTION

Figure 1:
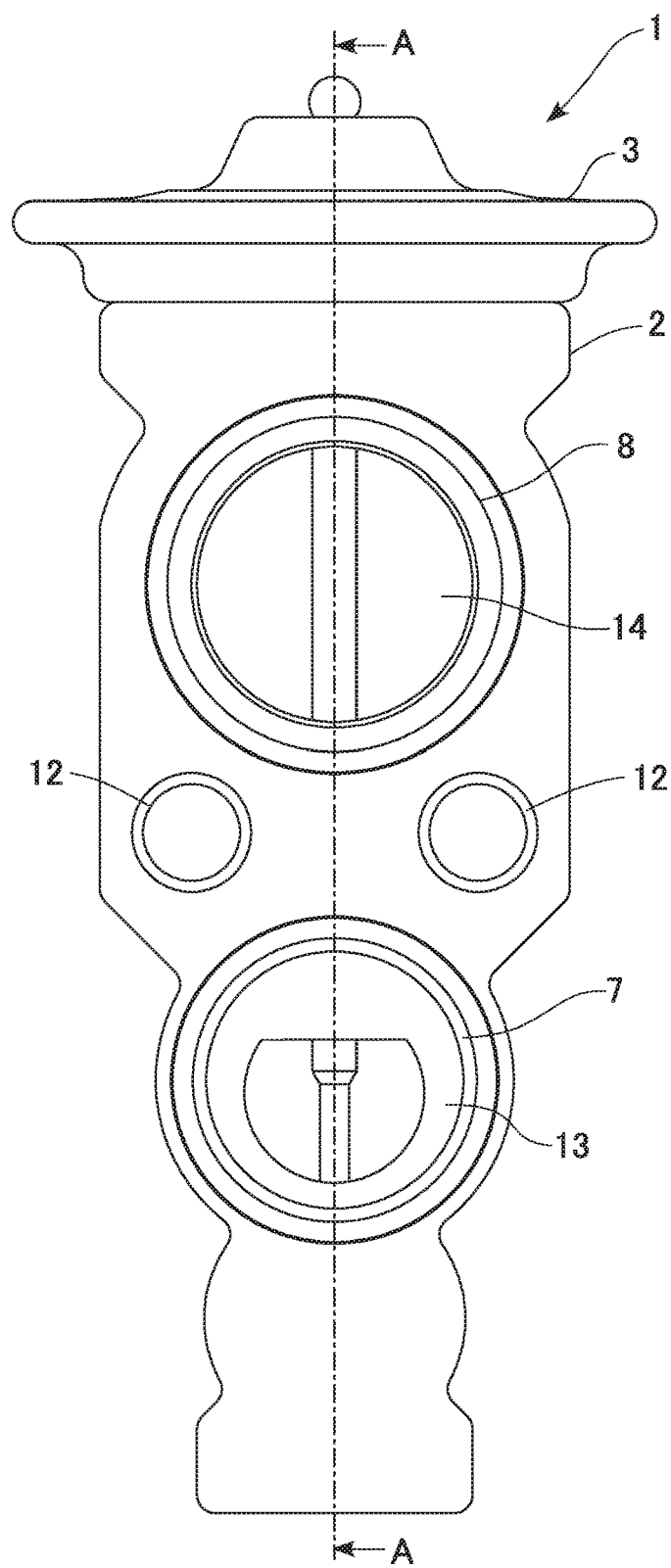
FIG. 1 is a front view of an expansion valve according to a first embodiment.

The invention will now be described by reference to certain embodiments. This does not intend to limit the scope of the present invention, but to exemplify the invention.

Embodiments of the present invention will now be described in detail with reference to the drawings. In the description below, for convenience of description, the positional relationship in each structure may be expressed with reference to how the structure is depicted in the drawings. In the following embodiments and their modifications, components that are substantially the same will be designated by the same reference numerals and redundant description thereof will be omitted as appropriate.

[First Embodiment]

The embodiment embodies an expansion valve of the present invention in a form of a thermostatic expansion valve applicable to a refrigeration cycle in an automotive air conditioner. The refrigeration cycle includes a compressor for compressing a circulating refrigerant, a condenser (external heat exchanger) for condensing the compressed refrigerant, a receiver for separating the condensed refrigerant into gas and liquid, an expansion valve for throttling and expanding the separated refrigerant and delivering the resulting spray of refrigerant, and an evaporator (internal heat exchanger) for evaporating the misty refrigerant to cool the air in a vehicle interior by evaporative latent heat. For convenience of description, detailed description of components other than the expansion valve will be omitted herein.

Figure 2:
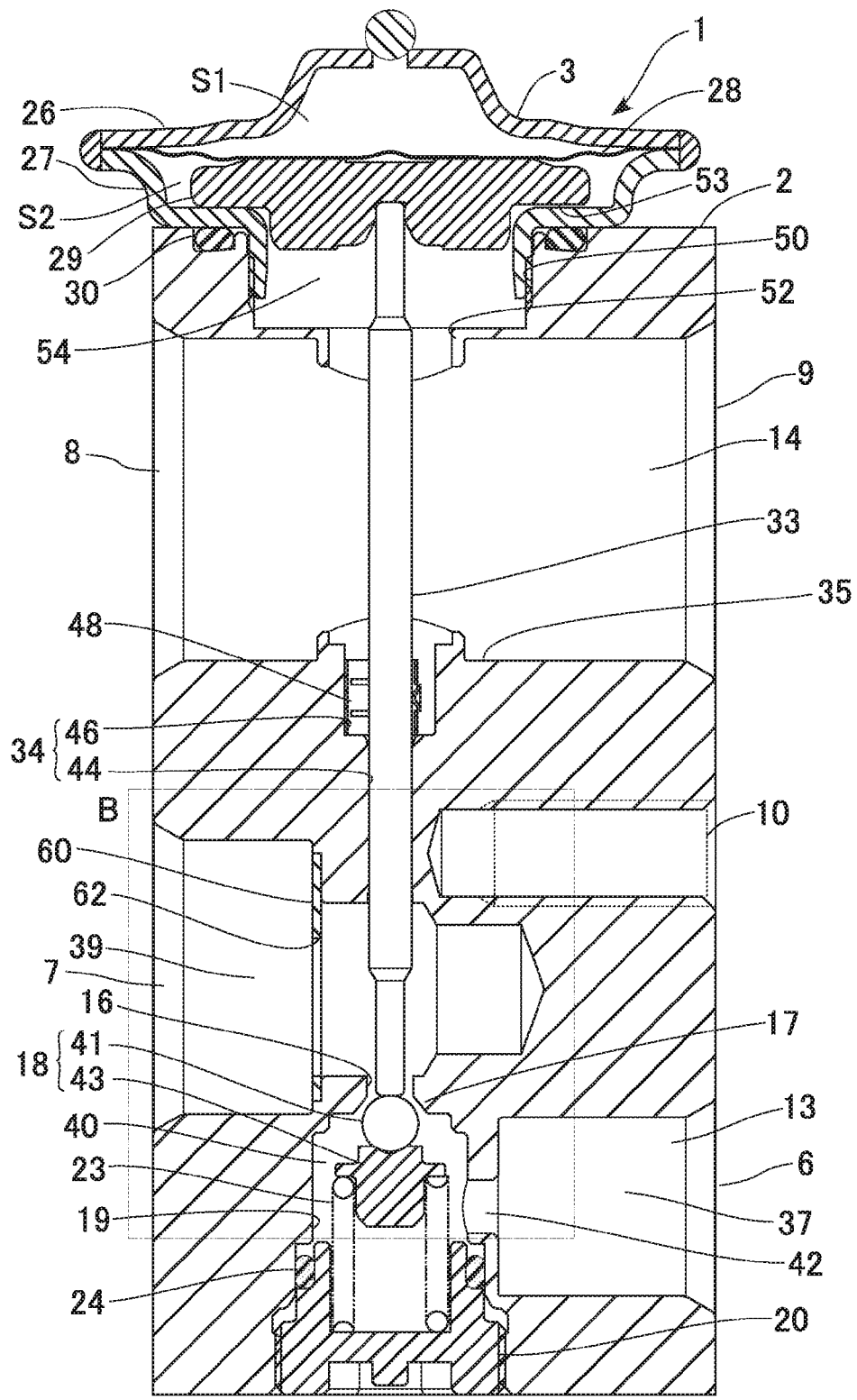
FIG. 2 is a cross-sectional view along arrows A-A in FIG. 1.

FIG. 1 is a front view of the expansion valve according to the first embodiment. FIG. 2 is a cross-sectional view along arrows A-A in FIG. 1. As illustrated in FIG. 1, the expansion valve 1 has a body 2 formed by extrusion molding of a material made of an aluminum alloy and performing predetermined cutting on the member obtained by the extrusion molding. The body 2 has a stepped prism shape, and a valve section for throttling and expanding the refrigerant is provided inside the body 2. A power element 3, which functions as a "drive section", is disposed at an end in the longitudinal direction of the body 2.

A first passage 13 through which the refrigerant flowing from the condenser toward the evaporator passes is open in a lower part of the body 2, and a second passage 14 through which the refrigerant flowing from the evaporator to the compressor passes is open in an upper part of the body 2. A pair of mounting holes 12 into which bolts for mounting pipes, which are not illustrated, are formed in parallel through the body 2 between the first passage 13 and the second passage 14.

As illustrated in FIG. 2, the body 2 has, on sides thereof, an inlet port 6 through which a high-temperature and high-pressure refrigerant is introduced from the receiver side (condenser side), an outlet port 7 through which the low-temperature and low-pressure refrigerant resulting from the throttling expansion through the expansion valve 1 is delivered toward the evaporator, an inlet port 8 through which the refrigerant evaporated by the evaporator is introduced, and an outlet port 9 through which the refrigerant having passed through the expansion valve 1 is delivered to the compressor side. In the present embodiment, the inlet port 6 and the outlet port 9 are open in a first side face of the body 2. The outlet port 7 and the inlet port 8 are open in a second side face opposite to the first side face. In a modification, the first side face and the second side face may be adjacent to each other at the right angle. A screw hole 10 for mounting a pipe is formed between the inlet port 6 and the outlet port 9. Each of the ports is connected with a pipe joint.

In the expansion valve 1, the inlet port 6, the outlet port 7, and a refrigerant passage connecting these ports constitute the first passage 13. A valve section is formed in an intermediate portion of the first passage 13. The refrigerant introduced through the inlet port 6 is throttled and expanded into a spray through the valve section, and delivered toward the evaporator through the outlet port 7. In addition, the inlet port 8, the outlet port 9, and a refrigerant passage connecting these ports constitute the second passage 14. The second passage 14 extends straight and an intermediate portion thereof communicates with the inside of the power element 3. Part of the refrigerant introduced through the inlet port 8 is supplied to the power element 3 by which the temperature of the refrigerant is sensed. The refrigerant having passed through the second passage 14 is delivered toward the compressor through the outlet port 9.

A valve hole 16 is formed at the intermediate portion of the first passage 13, and a valve seat 17 is formed by an open end edge of the valve hole 16 on the side of the inlet port 6. A valve element 18 is disposed facing the valve seat 17 from the side of the inlet port 6. The valve element 18 has a spherical ball valve element 41 for opening and closing the valve section by leaving and touching the valve seat 17, and a valve element support 43 for supporting the ball valve element 41 from below, which are joined together.

A communication hole 19 connecting the inside and the outside of the body 2 is formed in the lower part of the body 2. The upper half of the communication hole 19 forms a valve chamber 40, in which the valve element 18 is accommodated. The valve chamber 40 communicates with the valve hole 16, and is formed coaxially with the valve hole 16. The valve chamber 40 also communicates with the inlet port 6 at a lateral side thereof via an upstream-side passage 37. The upstream-side passage 37 includes a small hole 42 that is open toward the valve chamber 40. The small hole 42 is a portion of the first passage 13 where the cross-section of the first passage 13 is locally made small.

The valve hole 16 communicates with the outlet port 7 via a downstream-side passage 39. Thus, the upstream-side passage 37, the valve chamber 40, the valve hole 16, and the downstream-side passage 39 constitute the first passage 13. The upstream-side passage 37 and the downstream-side passage 39 are parallel to each other and each extend in a direction perpendicular to the axis of the valve hole 16. In a modification, the inlet port 6 or the outlet port 7 may be positioned so that projections of the upstream-side passage 37 and the downstream-side passage 39 are perpendicular to each other (so that the upstream-side passage 37 and the downstream-side passage 39 are skew with respect to each other). The downstream-side passage 39 is provided with a plate 60 functioning as a "wall member," details of which will be described later.

An adjusting screw 20 is screwed into a lower half of the communication hole 19 in such a manner as to seal the communication hole 19 from outside. A spring 23 for biasing the valve element 18 in a valve closing direction is disposed between the valve element 18 (more specifically, the valve element support 43) and the adjusting screw 20. The load of the spring 23 can be adjusted by adjustment of the insertion amount of the adjusting screw 20 into the body 2. An O-ring 24 for preventing leakage of the refrigerant is disposed between the adjusting screw 20 and the body 2.

A recess 50 is formed at an upper end of the body 2, and an opening 52 connecting the inside and the outside of the body 2 is formed at a bottom of the recess 50. The power element 3 has a lower part screwed into the recess 50 and is mounted on the body 2 in such a manner as to seal the opening 52. A space between the recess 50 and the power element 3 constitutes a temperature sensitive chamber 54.

The power element 3 has a diaphragm 28 provided between an upper housing 26 and a lower housing 27 thereof, and a disc 29 disposed on the lower housing 27 side of the diaphragm 28. The upper housing 26 is formed by press-forming a stainless steel material into a lidded shape. The lower housing 27 is formed by press-forming a stainless steel material into a stepped cylindrical shape. The disc 29 is made of aluminum or an aluminum alloy, for example, and has a higher thermal conductivity than the upper and lower housings.

The power element 3 is formed in a shape of a container by making the upper housing 26 and the lower housing 27 in contact with each other at the openings thereof, mounting the diaphragm 28 so that an outer edge of the diaphragm 28 is placed between outer edges of the upper housing 26 and the lower housing 27, and welding along a circumferential joint of the upper and lower housing. The inside of the power element 3 is partitioned into a closed space S1 and an open space S2 by the diaphragm 28. A gas for sensing temperature is sealed in the closed space S1. The open space S2 communicates with the second passage 14 via the opening 52. An O-ring 30 for preventing leakage of the refrigerant is disposed between the power element 3 and the body 2. The pressure and the temperature of the refrigerant passing through the second passage 14 are transmitted to a lower surface of the diaphragm 28 through the opening 52 and a groove 53 formed on the disc 29. The temperature of the refrigerant is transmitted to the diaphragm 28 mainly by the disc 29 having a high thermal conductivity.

An insertion hole 34 is formed through a partition 35 that separates the first passage 13 from the second passage 14 at a middle part of the body 2. The insertion hole 34 is a stepped hole having a small-diameter part 44 and a large-diameter part 46, which are coaxial with each other. A lower end of the small-diameter part 44 is open toward the first passage 13, while an upper end of the large-diameter part 46 is open toward the second passage 14. An elongated shaft 33 extends through the small-diameter part 44 slidably in the axial direction. The large-diameter part 46 constitutes a mounting hole in which a vibration-proof spring 48, which will be described below, is contained in a coaxial manner.

The shaft 33 is a rod made of a hard material such as stainless steel, and disposed between the disc 29 and the valve element 18. This enables the drive force generated by displacement of the diaphragm 28 to be transmitted to the valve element 18 via the disc 29 and the shaft 33 to open or close the valve section. One end side of the shaft 33 extends through the second passage 14 and is connected to the disc 29. The other end side of the shaft 33 extends through the first passage 13 and the valve hole 16 and is connected to the valve element 18.

The large-diameter part 46 contains the vibration-proof spring 48 for applying biasing force in a direction perpendicular to the direction of axis of the shaft 33, that is, a lateral load (sliding load) onto the shaft 33. The shaft 33 is subjected to the lateral load of the vibration-proof spring 48, which suppresses vibration of the shaft 33 and the valve element 18 due to refrigerant pressure fluctuation.

The vibration-proof spring 48 is fixed coaxially with the small-diameter part 44, and supports the shaft 33 with the shaft 33 coaxially extending through the vibration-proof spring 48. The vibration-proof spring 48 biases the shaft 33 radially inward to apply sliding resistance (friction) thereto.

In the present embodiment, a clearance between the insertion hole 34 and the shaft 33 is sufficiently small to achieve clearance seal to prevent or minimize leakage of refrigerant from the first passage 13 into the second passage 14. In a modification, a seal ring such as an O-ring may be disposed between the insertion hole 34 and the shaft 33 to prevent leakage of refrigerant from the first passage 13 into the second passage 14.

In the expansion valve 1 having the structure as described above, the power element 3 senses the pressure and the temperature of refrigerant having returned from the evaporator via the inlet port 8, and the diaphragm 28 displaces. This displacement of the diaphragm 28 results in the drive force, which is transmitted to the valve element 18 via the disc 29 and the shaft 33 so as to open and close the valve section. In the meantime, a liquid refrigerant supplied from a receiver is introduced through the inlet port 6, throttled and expanded while passing through the valve section to be turned into a low-temperature and low-pressure spray of refrigerant. The refrigerant is delivered through the outlet port 7 toward the evaporator.

Next, a noise reducing structure provided near the valve section will be described in detail.

Figure 3A:
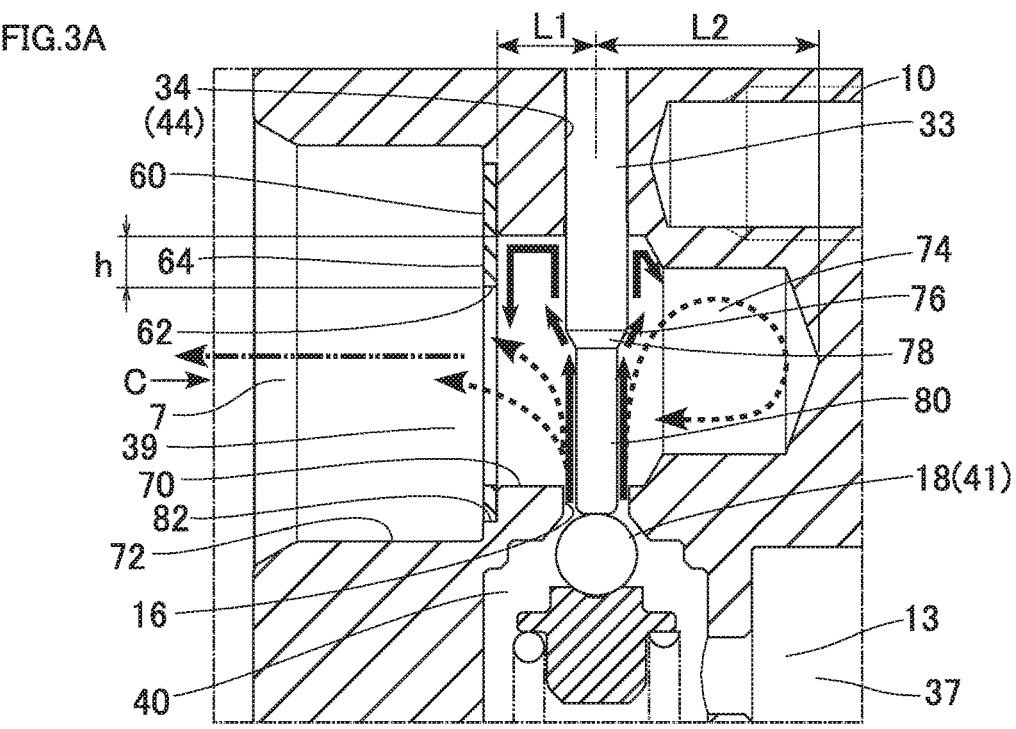
FIGS. 3A to 3C are diagrams illustrating a wall member and a structure around the wall member.
Figure 3B:
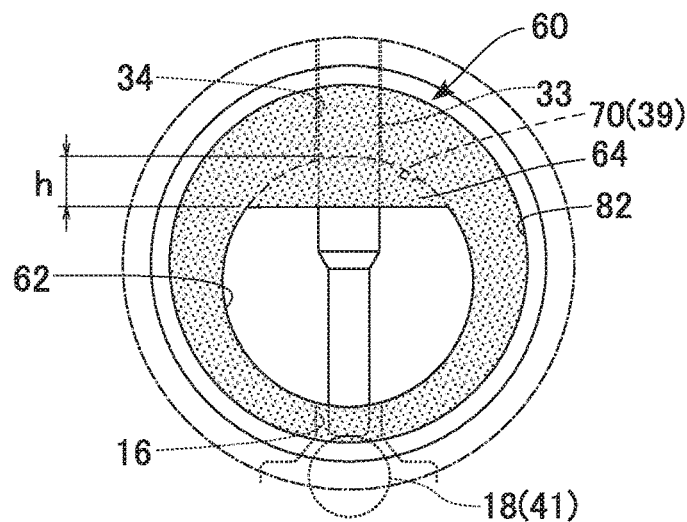
Figure 3C:
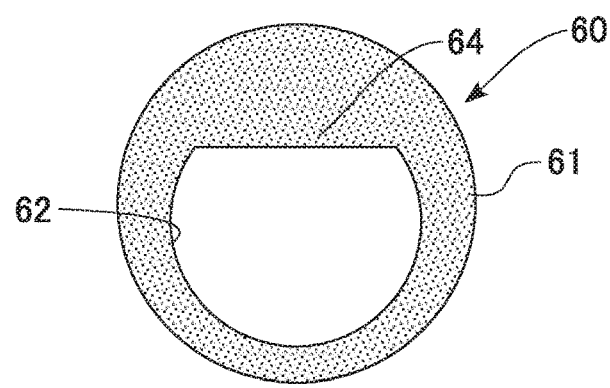

FIGS. 3A to 3C are diagrams illustrating a wall member and a structure around the wall member. FIG. 3A is an enlarged view of part B in FIG. 2, and FIG. 3B is a view as seen in the direction of an arrow C in FIG. 3A. FIG. 3C is a front view of the plate 60.

As illustrated in FIGS. 3A and 3B, the downstream-side passage 39 is a stepped circular hole having a small-diameter part 70 and a large-diameter part 72, and intersects at right angle with the valve hole 16 and the insertion hole 34 at the small-diameter part 70. The valve hole 16 is open into a lower portion of the small-diameter part 70, while the insertion hole 34 is open into an upper portion of the small-diameter part 70. A part of the small-diameter part 70 on a side opposite to the large-diameter part 72 is further reduced in diameter and forms a space 74 downstream of the valve hole 16. The large-diameter part 72 is a part to which a pipe (joint) leading to the evaporator is connected. The outlet port 7 is located at the opening of the large-diameter part 72. The axes of the small-diameter part 70 and the large-diameter part 72 are vertically spaced apart from each other in parallel so that the downstream-side passage 39 does not interfere with the valve chamber 40 and the screw hole 10.

The shaft 33 has a stepped part (tapered part) 76 having a gradually reduced diameter in the downstream-side passage 39. The stepped part 76 has a tapered surface 78 facing the valve hole 16. A small-diameter part 80 on one end side of the stepped part 76 extends to the valve hole 16 and is connected with the valve element 18. The ball valve element 41 is in contact with the end of the shaft 33. In the present embodiment, the valve hole 16 has a diameter of 2.6 mm, and the shaft 33 has a diameter of 1.6 to 2.4 mm.

An annular fitting recess 82 is formed at the bottom of the large-diameter part 72, and a metal plate 60 is press-fitted into the fitting recess 82. In other words, the plate 60 is disposed at the boundary between the large-diameter part 72 and the small-diameter part 70. As also illustrated in FIG. 3C, the plate 60 has a plate body 61 having a disc-like shape and an opening 62 having an arch shape (a shape connecting the ends of an arc or a shape connecting an arc and its chord). The upper side (the chord) of the opening 62 extends perpendicularly to the axis of the shaft 33, forming a flat shape. The arc of the opening 62 has a diameter substantially equal to the inner diameter of the downstream end of the small-diameter part 70.

Thus, as also illustrated in FIGS. 3A and 3B, the plate 60 has a shield part 64 covering an upper portion of the downstream end of the small-diameter part 70. The shield part 64 has a height h in the radial direction (downward direction) from a projected position of the opening of the insertion hole 34 at the downstream end of the small-diameter part 70. The shield part 64 blocks a projected position of the shaft 33 over a range of the height h. The other range at the downstream end of the small-diameter part 70 is not blocked. The "projected position" used herein refers to a relative position of a projection onto the downstream-side passage 39 in the axial direction as viewed in the direction of the arrow C in FIG. 3A (that is, a relative position shown in FIG. 3B).

As will be described below, the height h is 2 mm or larger. In addition, the downstream-side passage 39 is designed so that a distance L2 between the axial position of the shaft 33 and the end position of the small-diameter part 70 is larger than a distance L1 between the axial position of the shaft 33 and the plate 60. In other words, the hole at the depth is made to be deep as viewed from the outlet port 7 side. This makes the space upstream of the shield part 64 downstream of the valve hole 16 large, and the gas phase and the liquid phase of the refrigerant are readily mixed in the space.

In the structure described above, the refrigerant introduced from the upstream side while the valve is open turns into a spray of refrigerant as a result of passing through a spacing (orifice passage) between the valve hole 16 and the small-diameter part 80 and is delivered to the downstream-side passage 39 as shown by thick arrows in FIG. 3A. In this process, if the refrigerant having passed through the valve hole 16 is in a gas-liquid two-phase state, the liquid phase of the refrigerant tends to flow along the surface of the shaft 33 (solid arrows), changes the flowing direction near the insertion hole 34, and is delivered toward the downstream. In contrast, the gas phase of the refrigerant tends to fill the space 74 and be delivered to the downstream (dotted arrows). In this process, the shield part 64 disperses part of the liquid phase by reflecting the liquid phase, which makes the liquid phase easily mix with the gas phase of the refrigerant subsequently flowing into a space (including the space 74) between the shield part 64 and the valve hole 16. This prevents or minimizes delivery of masses of the liquid phase, which have intermittently come from the upstream, to the downstream in masses (without being dispersed). As a result, generation of impact sound in downstream pipes is prevented or minimized as will be described later.

Conversely, since a projected range of the opening of the valve hole 16 at the downstream end of the small-diameter part 70 is not blocked, stagnation of the liquid phase of the refrigerant in the space between the plate 60 and the valve hole 16 is prevented or minimized. As a result, as will be described later, generation of impact sound caused by collision of the liquid stagnation with a subsequent flow of the refrigerant at the upstream of the plate 60 is prevented or minimized. Thus, according to the present embodiment, generation of impact sound is prevented or minimized inside and outside of the expansion valve 1, and noise due to the refrigerant passing through the expansion valve 1 is reduced.

Figure 4A:
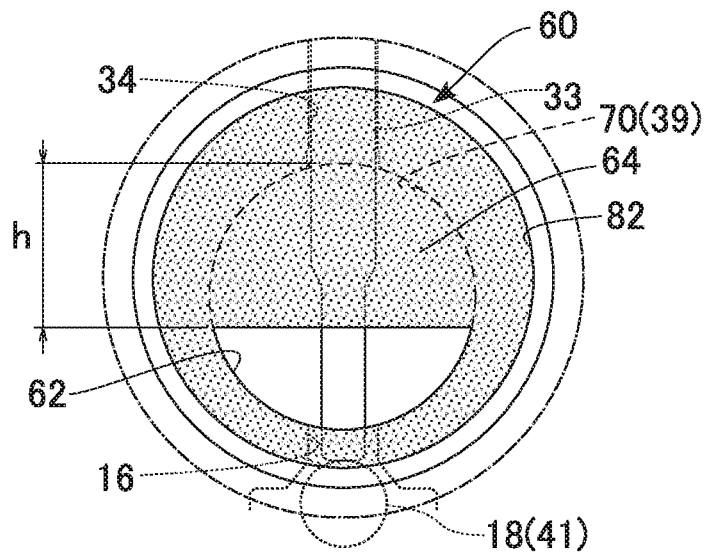
FIGS. 4A and 4B are diagrams illustrating shapes of plates used in experiments.
Figure 4B:
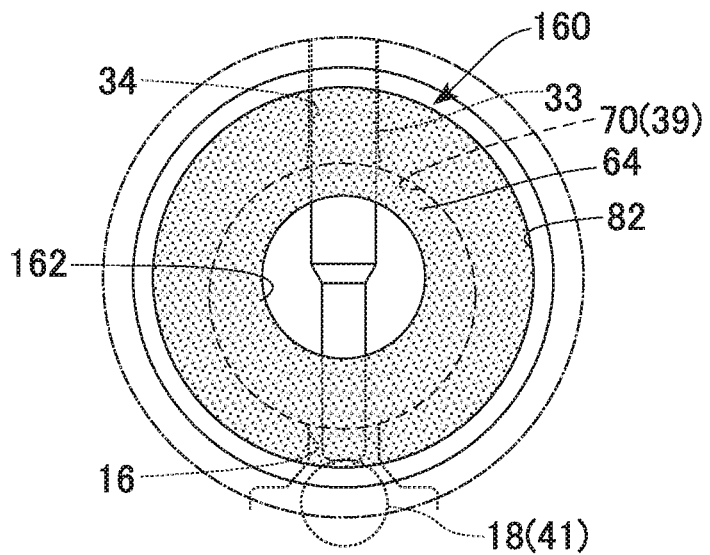

Next, results of experiments showing a difference in noise reduction effect due to the structure and arrangement of the shield part will be explained. FIGS. 4A and 4B are diagrams illustrating the shapes of the plate used in the experiments. FIG. 4A illustrates a structure according to the present embodiment, and FIG. 4B illustrates a structure according to a comparative example 1. In FIGS. 4A and 4B, broken lines indicate the small-diameter part 70.

As illustrated in FIG. 4A, according to the present embodiment, the opening 62 of the plate 60 has an arch shape (or a half-moon shape, a semicircular shape, or the like). At the downstream end of the small-diameter part 70, the shield part 64 blocks a range of a height h (mm) in the radial direction from the projected position of the opening of the insertion hole 34, and the other range is not blocked. In contrast, in the comparative example 1, an opening 162 (circular opening) is formed at the center of a plate 160, and a range radially outside of the opening 162 is blocked.

Figure 5A:
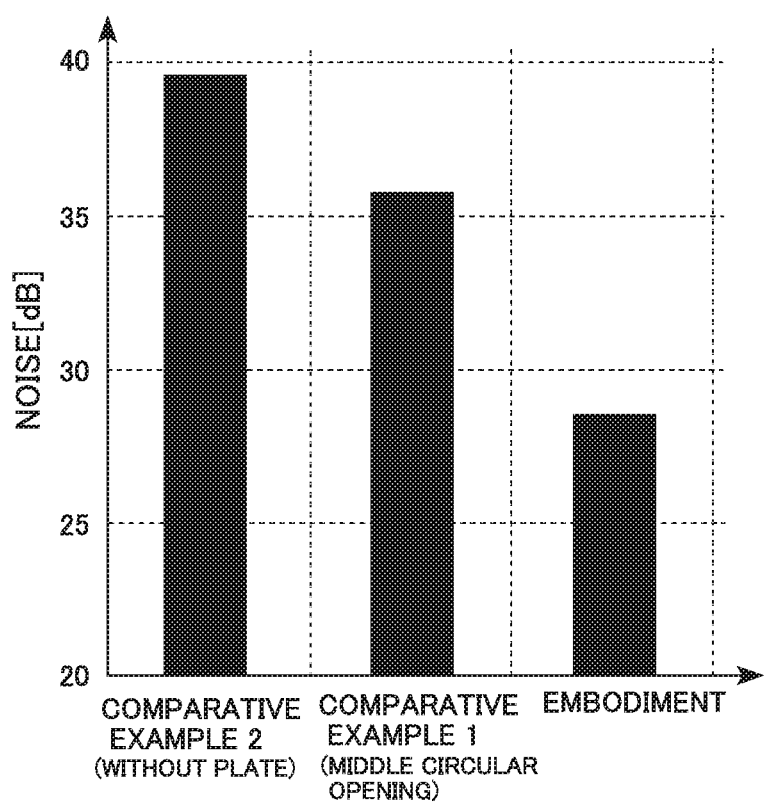
FIGS. 5A and 5B are graphs showing the relation between the plate shape and noise.
Figure 5B:
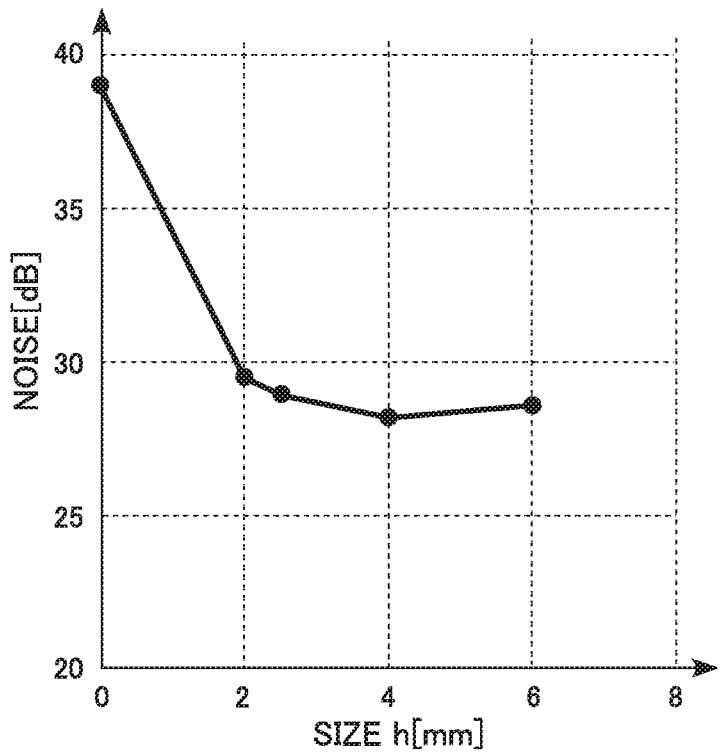

FIGS. 5A and 5B are graphs showing the relation between the plate shape and noise. FIG. 5A shows a noise level (dB) (mainly the impact sound of collision between the liquid stagnation and the refrigerant) detected near an outlet of an evaporator in an air conditioner (near an air outlet in a vehicle interior). FIG. 5A shows a result of a comparative example 2 in addition to results of the present embodiment and the comparative example 1. In the comparative example 2, no plate is provided. FIG. 5B shows a change in the noise level when the height h of the shield part 64 is changed in the present embodiment. In FIG. 5B, the horizontal axis represents the height h (mm) and the vertical axis represents the noise level (dB). Note that, in this experiment, the opening 162 in the comparative example 1 is a circular opening having a diameter of 6 mm, and the area of the opening 62 in the present embodiment is equal to the area of the circular opening.

As shown in FIG. 5A, noise is reduced in the comparative example 1 as compared to the comparative example 2. This is considered to be because the formation of the throttle passage with the plate 160 suppresses pressure fluctuation due to introduction of the gas-liquid two-phase refrigerant and prevents or minimizes generation of impact sound of the refrigerant at the downstream of the expansion valve. Furthermore, noise is further reduced in the present embodiment than in the comparative example 1. This is considered to be because the shield part 64 has a sufficiently large height h and the opening 62 is largely open near the projected position of the opening of the valve hole 16 at the downstream end of the small-diameter part 70 in the present embodiment. In a case where the expansion valve 1 is disposed vertically as illustrated in FIG. 2, a lower portion in the gravity direction of the opening 62 is wide open to the small-diameter part 70. Thus, the height h of the shield part 64 is made to be large, which allows the liquid phase and the gas phase to be properly mixed at immediately upstream of the shield part 64, which prevents the liquid phase from being delivered in masses. Furthermore, when the expansion valve 1 is disposed vertically, since the lower portion in the gravity direction of the opening 62 is wide open, stagnation of the liquid phase in the space between the plate 60 and the valve hole 16 is prevented or minimized. Thus, generation of impact sound caused by collision of the liquid stagnation with subsequent refrigerant is prevented or minimized. Consequently, as described above, generation of impact sound is prevented or minimized inside and outside of the expansion valve 1, and noise caused by the refrigerant passing through the expansion valve 1 is thus reduced. In particular, as shown in FIG. 5B, the height h of the shield part 64 is set to 2 mm or larger, which produces a good impact sound reduction effect.

Figure 6:
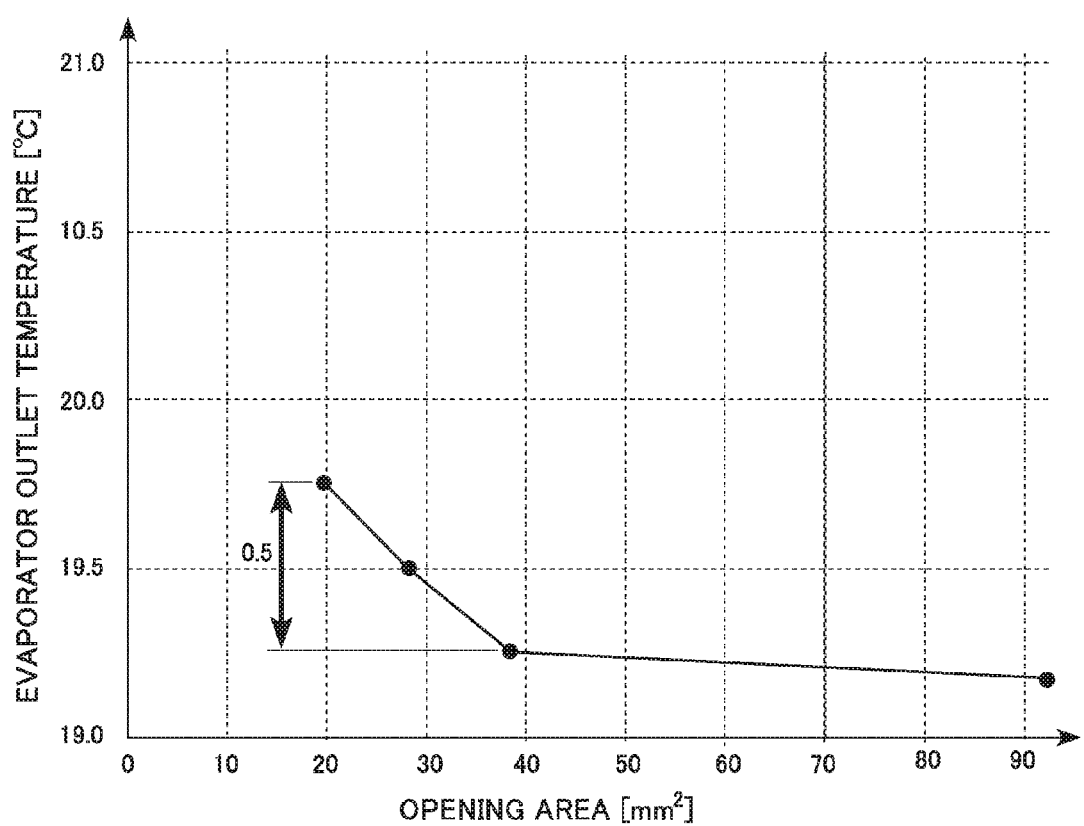
FIG. 6 is a graph showing the relation between an opening area of an opening and temperature at an evaporator outlet.

FIG. 6 is a graph showing a relation between the opening area of the opening 62 and the temperature at an outlet of the evaporator.

The results of the experiments have shown that a sufficiently large size of the shield part 64 is effective for noise reduction. However, as the shield part 64 is larger, the opening area of the opening 62 is smaller. It is thus necessary to make sure how the opening area affects the control of the expansion valve 1. Thus, the temperature at the evaporator outlet (the temperature at the air outlet) was measured while the opening area of the opening 62 was gradually decreased from 92 mm$^2$. The measurement result has shown that the outlet temperature tends to rise greatly higher than a target temperature when the opening area is smaller than about 40 mm$^2$. When the opening area is smaller than 20 mm$^2$, the different between the outlet temperature and the target temperature exceeds 0.5° C, which is determined, by those skilled in the art, to be insufficient for cooling power of an air conditioner. Furthermore, if the opening area of the opening 62 is smaller than necessary, noise (wind noise) caused by the passing refrigerant becomes louder. The opening area of the opening 62 is therefore preferably, 20 mm$^2$ or larger, or more preferably 40 mm$^2$ or larger.

[Modifications]

Figure 7A:
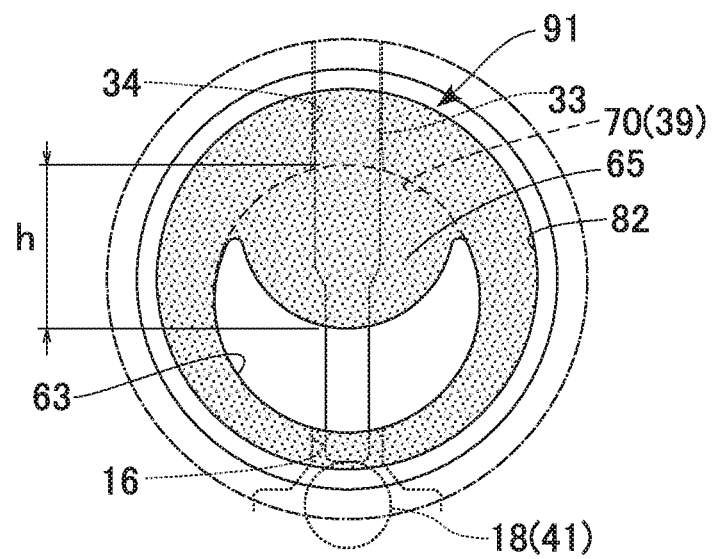
FIGS. 7A and 7B are diagrams illustrating noise reduction structures according to modifications of the first embodiment.
Figure 7B:
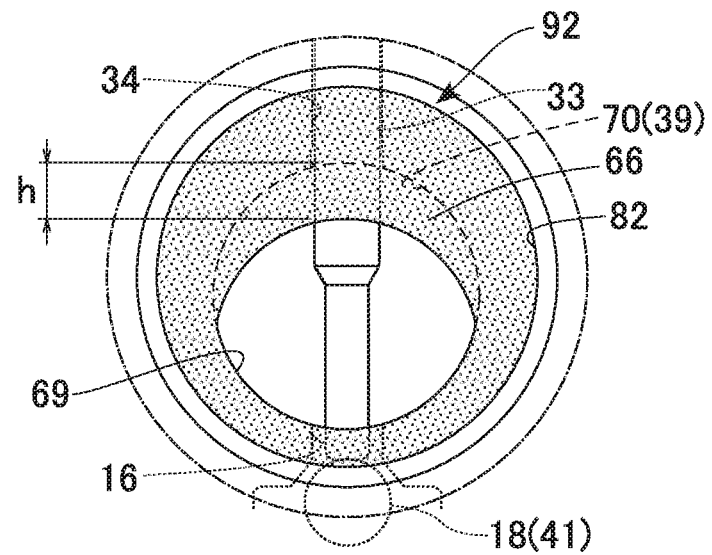

FIGS. 7A and 7B are diagrams illustrating noise reduction structures according to modifications of the first embodiment. FIG. 7A illustrates a first modification, and FIG. 7B illustrates a second modification. In the first modification illustrated in FIG. 7A, a plate 91 has an opening 63 (an arc-like slit) having a crescent shape (or a U-shape or V-shape). Such a structure allows a shield part 65 covering a projected position near the shaft 33 to have a large height h and also allows the opening at a position away from the projected position of the shaft 33 to be large. Specifically, an edge of the downstream end of the small-diameter part 70 on the side of a projected position of the valve hole 16 is not covered by a shield part 65 over a semicircular arc or larger. This allows the opening 63 to be wide open along the inner circumference of the small-diameter part 70. This is thus advantageous in that, even when the expansion valve is disposed horizontally, liquid stagnation is less likely to be caused upstream of the plate 91 and generation of impact sound caused by the refrigerant is prevented or minimized.

In the second modification illustrated in FIG. 7B, a plate 92 has an oval opening 69. In such a structure as well, the height h of a shield part 66 is set to 2 mm or larger, which produces a noise reduction effect. Note that the shape of the shield part (that is, the shape of the opening) can be selected from various shapes other than those mentioned herein. At the downstream end of the small-diameter part 70, the shield part preferably has a height of 2 mm or larger in the radial direction (the axial direction of the shaft 33) from the projected position of the opening of the insertion hole 34, and a width larger than the diameter of the shaft 33 over the range of the height h. This produces good noise reduction effect.

[Second Embodiment]

Figure 8A:
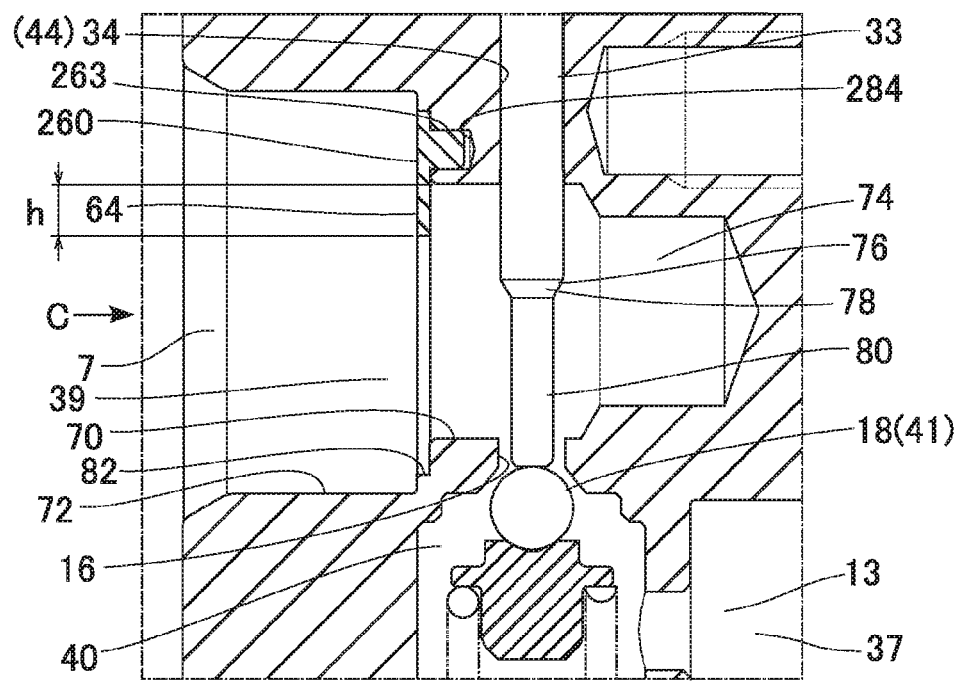
FIGS. 8A to 8C are diagrams illustrating a structure of a main part of an expansion valve according to a second embodiment.
Figure 8B:
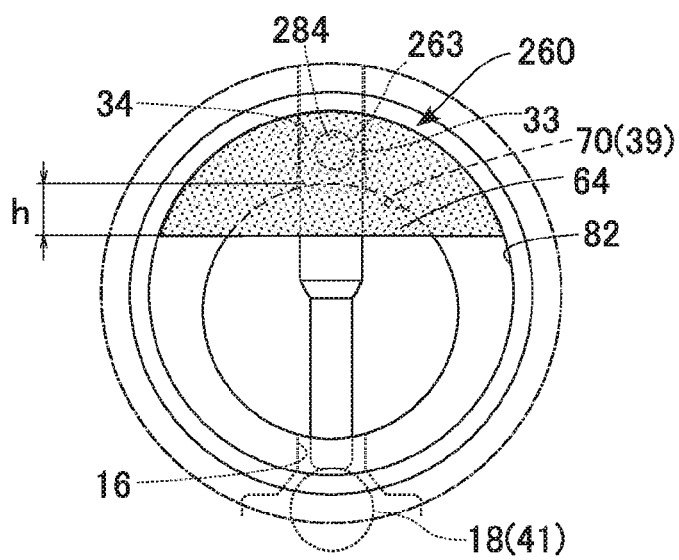
Figure 8C:
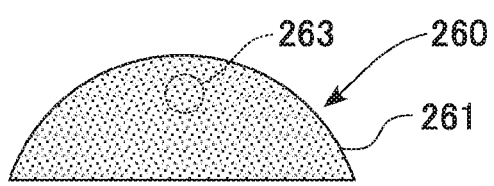

An expansion valve of the present embodiment is different from that of the first embodiment in the shape of the plate and the method for mounting the plate. The following description will focus on the differences from the first embodiment, and components similar to those in the first embodiment will be designated by the same reference numerals and the description thereof will be omitted. FIGS. 8A to 8C are diagrams illustrating a structure of a main part of the expansion valve according to the second embodiment. FIG. 8A is a partially-enlarged cross-sectional view of a plate and a structure around the plate, and FIG. 8B is a view as seen in the direction of an arrow C in FIG. 8A. FIG. 8C is a front view of the plate.

As illustrated in FIGS. 8A and 8B, the large-diameter part 72 has an annular fitting recess 82 at the bottom, and a fitting hole 284 is formed at a predetermined position in the fitting recess 82. As also illustrated in FIG. 8C, a plate 260 has a plate body 261 having an arch shape (or a semicircular shape or a half-moon shape), and a fitting portion 263 protrudes from one side surface of the plate body 261. The fitting portion 263 is a so-called press-fit pin. The fitting portion 263 is press-fitted into the fitting hole 284 while the plate body 261 is fitted into the fitting recess 82. As a result, the plate 260 is securely fixed to the downstream-side passage 39. In a modification, the fitting portion 263 may be a so-called spring pin. In this case, the fitting portion 263 is obtained by winding a leaf spring into a cylindrical shape. The fitting portion 263 is inserted into the fitting hole 284 while the plate body 261 is fitted into the fitting recess 82. As a result, the fitting portion 263 is press-fitted to the fitting hole 284 by an elastic reaction force of the leaf spring, and the plate 260 is securely fixed to the downstream-side passage 39. The plate 260 does not have a hole as in the first embodiment (the opening 62), and is disposed so that the plate 260 is shifted toward the projected position of the insertion hole 34 at the downstream end of the small-diameter part 70.

With such a structure as well, the downstream end of the small-diameter part 70 can be blocked similarly to the first embodiment (see FIG. 3B), and similar effects are produced. Furthermore, according to the present embodiment, press-fitting of the whole plate 260 into the fitting recess 82 need not be as highly accurate as in the first embodiment, which is advantageous in that production of the plate 260 is easier.

[Modification]

Figure 9A:
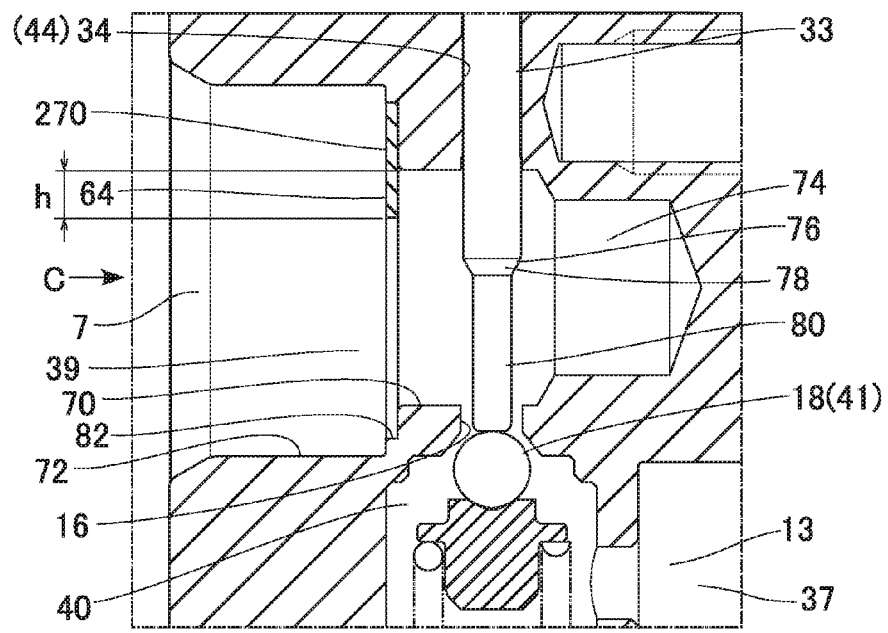
FIGS. 9A to 9C are diagrams illustrating a noise reduction structure according to a modification of the second embodiment.
Figure 9B:
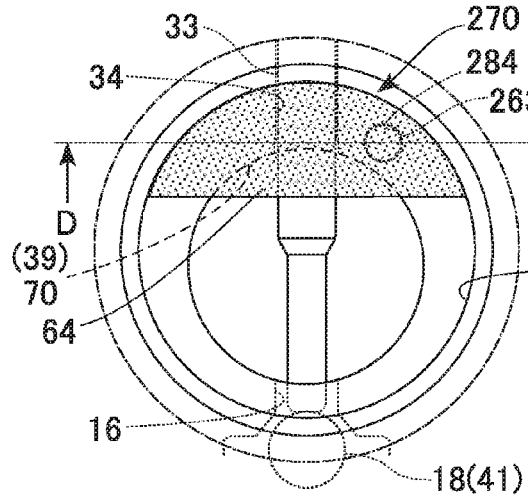
Figure 9C:
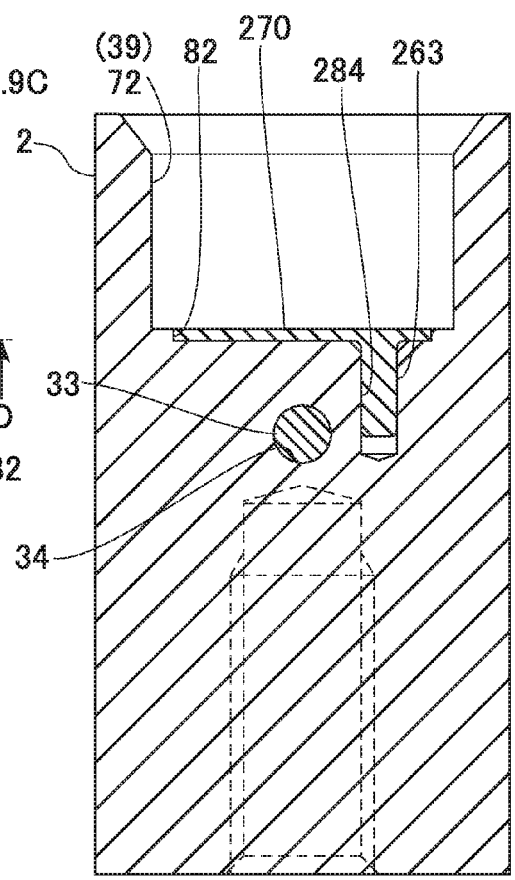

FIGS. 9A to 9C are diagrams illustrating a noise reduction structure according to a modification of the second embodiment. FIG. 9A is a partially-enlarged cross-sectional view of a plate and a structure around the plate, and FIG. 9B is a view as seen in the direction of an arrow C in FIG. 9A. FIG. 9C is a cross-sectional view taken along arrows D-D in FIG. 9B.

In this modification, as illustrated in FIG. 9B, the fitting hole 284 is formed at a position shifted to one side of the projected position of the shaft 33, and the fitting portion 263 is formed at a position in a plate 270 corresponding to the position of the fitting hole 284. With this structure, interference between the fitting portion 263 and the shaft 33 can be avoided. As a result, the fitting hole 284 can be made deeper than those in the above-described embodiments, and the fitting portion 263 can be made longer than those in the above-described embodiments. Consequently, the plate 270 is more stably fixed to the downstream-side passage 39.

[Third Embodiment]

Figure 10:
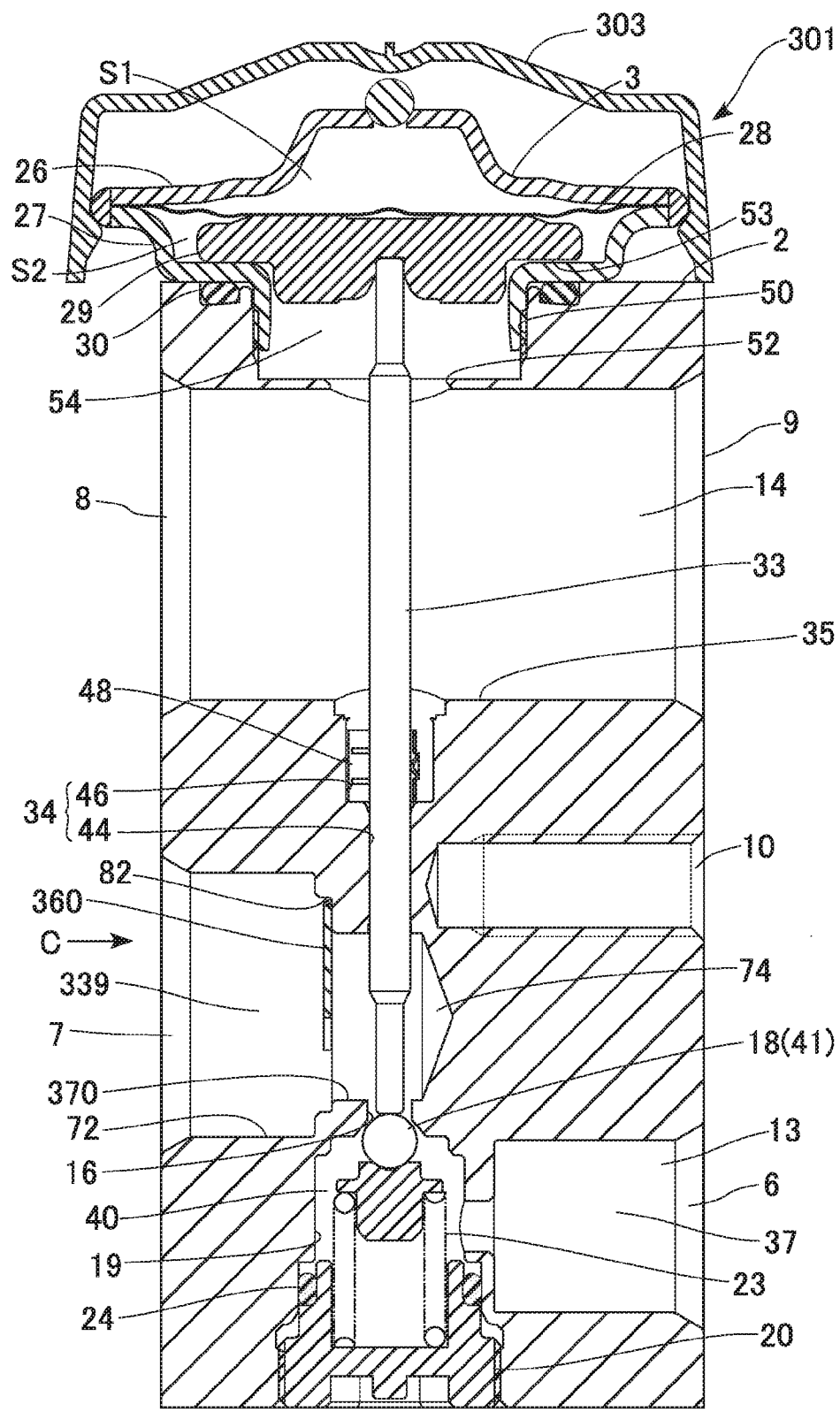
FIG. 10 is a cross-sectional view of an expansion valve according to a third embodiment.
Figure 11A:
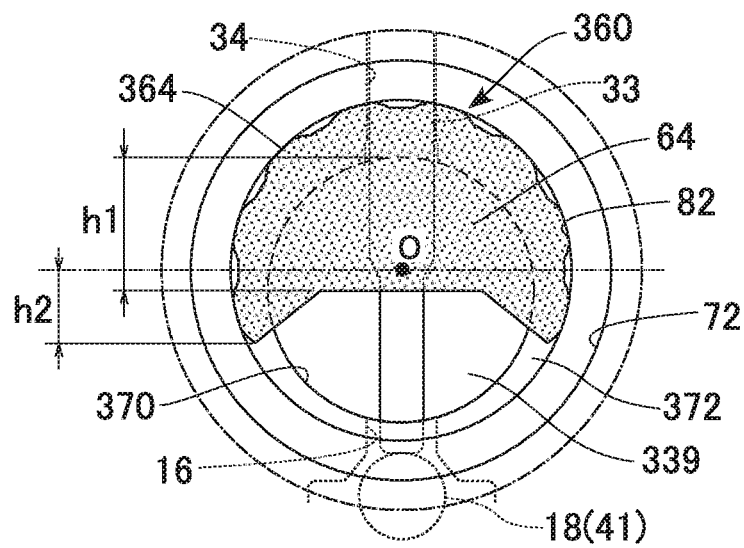
FIGS. 11A and 11B are diagrams illustrating a plate and a structure around the plate.
Figure 11B:
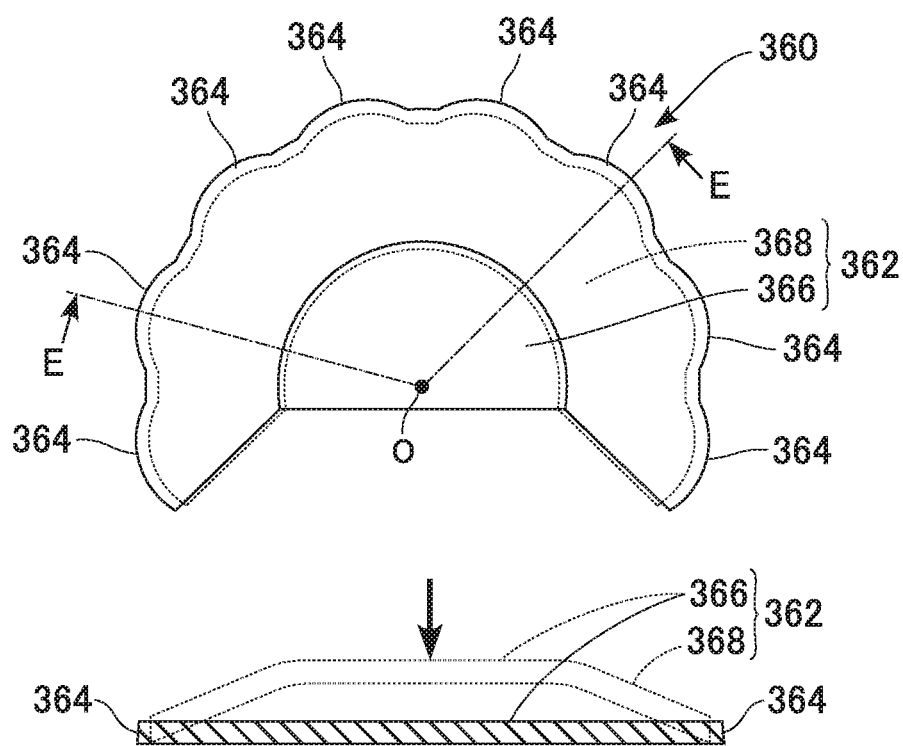

An expansion valve of the present embodiment is different from those of the first and second embodiments in the shape of a plate (a plate member) and the method for mounting the plate. The following description will focus on the differences from the first and second embodiments. FIG. 10 is a cross-sectional view of the expansion valve according to the third embodiment. FIGS. 11A and 11B are diagrams illustrating a plate and a structure around the plate. FIG. 11A is a view as seen in the direction of an arrow C in in FIG. 10. FIG. 11B is a diagram illustrating a structure of the plate, in which an upper part is a front view and a lower part is a cross-sectional view taken along arrows E-E in the upper part. In FIGS. 11A and 11B, dotted lines represent a state before the plate is fixed to the downstream-side passage, and solid lines represent a state after the plate is fixed.

As illustrated in FIG. 10, in an expansion valve 301, a plate 360 is fixed to an upper half of the fitting recess 82 (functioning as an "annular part") by a pressure in the radial direction (contact surface pressure). Although the depth of a small-diameter part 370 of a downstream-side passage 339 is small in the present embodiment, the small-diameter part 370 may be deeper as in the first embodiment and the space 74 of the hole at the depth may be larger.

In the present embodiment, a heat insulating cover 303 made of plastic is attached to the upper housing 26, so that the power element 3 will not react too sensitively to the air temperature in the engine compartment.

As illustrated in FIG. 11A, an annular fitting recess 82 is formed at the bottom of the large-diameter part 72, and a step 372 is formed at the boundary of the large-diameter part 72 and the small-diameter part 370. The outer periphery of the plate 360 is thus stopped by the step 372 and fixed to the fitting recess 82 by the contact surface pressure in the radial direction. As also illustrated in the upper part of FIG. 11B, the plate 360 has a plate body 362 having a fan shape larger than a semicircle, and a plurality of protrusions 364 formed at regular intervals along the outer circumference of the plate body 362. The protrusions 364 each have an arc shape. As illustrated in the lower part of FIG. 11B, in the state before being fixed to the fitting recess 82 (see the dotted lines), the plate 360 has such a shape in which a middle part 366 of the plate body 362 bulges to one side of the plate body 362. The middle part 366 is flat and connected with the protrusions 364 via a tapered part 368 (inclined surface) around the middle part 366.

The plate 360 is made of a metal material that is excellent in malleability and plastically deformable. For fixing the plate 360 to the downstream-side passage 339, the plate 360 is inserted into the outlet port 7 from the side where the middle part 366 does not bulge, and fitted into the fitting recess 82. In this state, the middle part 366 is pressed toward the small-diameter part 370 of the downstream-side passage 339 (as indicated by a thick arrow). Since the outer periphery of the plate 360 is stopped from moving deeper by the step 372, the tapered part 368 then plastically deforms inward along the step 372. As a result, the circumferential edge of the plate body 362 is slightly pressed out in the radial direction, and the respective protrusions 364 are pressed against the inner surface of the fitting recess 82. In other words, the plate 360 is fixed to the inner surface of the fitting recess 82 in a tightly stretched manner by the contact surface pressure in the radial direction.

Specifically, the plate 360 deforms from the state bulging to one side (see the dotted lines) to a flat state (see the solid lines) as illustrated in FIG. 11B, and is fixed to the inside of the downstream-side passage 339 as illustrated in FIG. 11A. Note that the term "flat" used herein is a concept including a substantially flat shape. The upper half of the plate 360 is fixed to the fitting recess 82 at the positions of the protrusions 364 by the contact surface pressure (reaction force against the pressing force) whereas the lower half of the plate 360 is open. With this structure, the upper half of the downstream end of the small-diameter part 370 is blocked by the shield part 64 whereas the lower half is open. Since, however, the protrusions 364 at both ends of the plate 360 are located below the center O of the fitting recess 82, deviation (dropping off) of the plate 360 in the radial direction while the plate 360 is inserted into the downstream-side passage 339 is prevented.

According to the present embodiment, since the plate 360 has a fan shape larger than a semicircle, a sufficient area (a height h1) of the shield part 64 is obtained, similarly to the first and second embodiments. In addition, since the outer periphery of the plate 360 has an arc shape larger than a semicircle, the fixing position (the pressure contact position) of the plate 360 can be provided in a height range larger than the radius of the fitting recess 82 (see a height h2). This allows the plate 360 to be stably fixed to the inside of the downstream-side passage 339.

[Modification]

Figure 12:
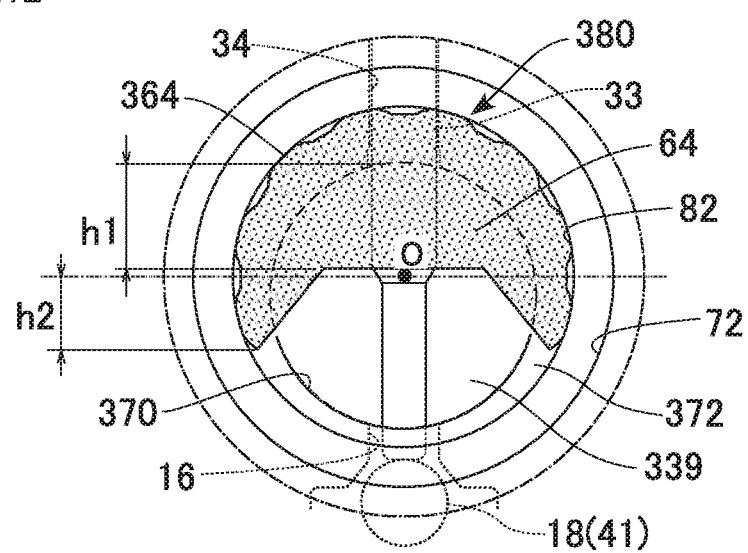
FIG. 12 is a diagram illustrating a plate and a structure around the plate according to a modification of the third embodiment.

FIG. 12 is a diagram illustrating a plate and a structure around the plate according to a modification of the third embodiment.

In this modification, a height h1 of a shield part 64 of a plate 380 is smaller than that in the third embodiment (see FIG. 11A). Specifically, the middle of the bottom of the plate 380 does not reach the center O of the fitting recess 82. With this structure as well, since the height h1 is 2 mm or larger, the effects similar to those in the third embodiment can be produced.

While examples in this eight protrusions are provided along the outer periphery of the plate 360, 380 have been presented in the present embodiment and the modification, the number of protrusions may be changed as appropriate. The shape of the protrusion may be any shape that is deformable when being pressed (pressurized or subjected to pressure contact) against the annular part, and various shapes may be used. For example, the plate may have a polygonal shape, and may be fixed to (subjected to pressure contact with) the annular part at the vertexes of the polygon. Alternatively, the outer periphery of the plate may have a shape of one circular arc being in contact with the inner surface of the fitting recess 82 along the circular arc edge, instead of having an indented pattern being in contact with the inner surface of the fitting recess 82 at protrusions of the indented pattern.

The description of the present invention given above is based upon certain embodiments. The embodiments are intended to be illustrative only and it will be obvious to those skilled in the art that various modifications could be further developed within the technical idea underlying the present invention.

While plate-like members are presented as examples of the wall member in the embodiments described above, a block-like member or other members may alternatively be used, for example.

In the embodiments described above, examples in which the noise reduction structures described above are applied to thermostatic expansion valves have been presented. In a modification, similar structures may be applied to motor-operated expansion valves having a motor or the like as a drive unit. In this case, the temperature sensing function becomes unnecessary, and the second passage 14 may thus be omitted in such a motor-operated expansion valve.

Although the expansion valve of the embodiments described above is suitably applicable to a refrigeration cycle using an alternative for chlorofluorocarbon (HFC-134a) or the like as the refrigerant, the expansion valve of the present invention can also be applied to a refrigeration cycle using a refrigerant such as carbon dioxide with high working pressure. In this case, an external heat exchanger such as a gas cooler is provided instead of the condenser in the refrigeration cycle.

In the embodiments described above, examples in which the expansion valve is a valve for throttling and expanding a refrigerant having flowed therein via an external heat exchanger and supplying the resulting refrigerant to an evaporator (internal evaporator) have been presented. In a modification, the expansion valve may be applied to a heat pump automotive air conditioner and disposed downstream of an internal condenser (internal heat exchanger). Specifically, the expansion valve may be a valve for throttling and expanding a refrigerant having flowed therein via an internal condenser and supplying the resulting refrigerant to an external heat exchanger (external evaporator).

The present invention is not limited to the above-described embodiments and modifications only, and those components may be further modified to arrive at various other embodiments without departing from the scope of the invention. Various other embodiments may be further formed by combining, as appropriate, a plurality of structural components disclosed in the above-described embodiments and modifications. Furthermore, one or some of all of the components exemplified in the above-described embodiments and modifications may be left unused or removed.

What is claimed is:

1. An expansion valve for use in a refrigeration cycle, for throttling and expanding a refrigerant flowing from an upstream side and supplying the expanded refrigerant to an evaporator, the expansion valve comprising:

a body having an inlet port through which the refrigerant is introduced from the upstream side, an outlet port through which the refrigerant is delivered to a downstream side, a valve hole through which the inlet port and the outlet port communicate with each other, an insertion hole formed coaxially with the valve hole, and a downstream-side passage intersecting at right angle with the valve hole and the insertion hole and through which the valve hole and the outlet port communicate with each other;

a valve element configured to move toward and away from the valve hole to close and open a valve section;

a drive unit provided on the body and configured to generate a drive force for opening or closing the valve section;

a shaft slidably extending through the insertion hole, having a first end connected to the drive unit and a second end connected to the valve element through the downstream-side passage and the valve hole, and being configured to transmit the drive force of the drive unit to the valve element; and a wall member provided in the downstream-side passage, wherein the downstream-side passage includes a small-diameter part to which the valve hole and the insertion hole are open, and a large-diameter part to which a pipe leading to the evaporator is connected, wherein the wall member has a shield part partially covering a downstream end of the small-diameter part, the shield part having a height of 2 mm or larger in a radial direction of the small-diameter part from a projected position of an opening of the insertion hole at the downstream end of the small-diameter part and a width equal to or larger than a radius of the shaft, wherein the shield part of the wall member does not cover at least a range of projection of an opening of the valve hole at the downstream end of the small-diameter part, wherein the wall member is a plate member, and wherein the plate member has plural surfaces forming an opening, angles being formed between adjacent ones of the plural surfaces of the plate member, the opening in the plate member providing access from the small-diameter part to the large-diameter part of the downstream-side passage.

2. The expansion valve according to claim 1, wherein the wall member is provided so that an opening area at the downstream end of the small-diameter part is 20 mm² or larger.

3. The expansion valve according to claim 1, wherein the wall member is provided so that a circumferential edge of a downstream end of the small-diameter part on a side of the projected position of the valve hole is not covered by the shield part but open at least over a semicircular arc or larger.

4. The expansion valve according to claim 1, wherein the plate member is disposed at a boundary between the large-diameter part and the small-diameter part, and the shield part is defined by a shape and a position of the plate member.

5. The expansion valve according to claim 4, wherein the plate member is positioned so that the plate member has a greater area towards the projected position of the insertion hole relative to any other part of the downstream end of the small-diameter part.

6. The expansion valve according to claim 4, wherein in the downstream-side passage, a distance between an axial position of the shaft and an end position of the small-diameter part is larger than a distance between the axial position of the shaft and the plate member.

7. The expansion valve according to claim 4,
wherein an outer periphery of the plate member is fixed to an annular part formed at the boundary between the large-diameter part and the small-diameter part by a contact surface pressure in the radial direction.

8. The expansion valve according to claim 7, wherein the outer periphery of the plate member has a part with a shape in contact with the annular part on a side opposite to the projected position of the valve hole, and
wherein the outer periphery includes a part fixed to the annular part by a contact surface pressure on a side of the projected position of the valve hole relative to a center of the annular part.

9. The expansion valve according to claim 7, wherein the wall member is provided so that an opening area at the downstream end of the small-diameter part is 20 mm² or larger,
wherein the outer periphery of the plate member has a part with a shape in contact with the annular part on a side opposite to the projected position of the valve hole, and
wherein the outer periphery includes a part fixed to the annular part by a contact surface pressure on a side of the projected position of the valve hole relative to a center of the annular part.

10. An expansion valve for use in a refrigeration cycle, for throttling and expanding a refrigerant flowing from an upstream side and supplying the expanded refrigerant to an evaporator, the expansion valve comprising:
a body having an inlet port through which the refrigerant is introduced from the upstream side, an outlet port through which the refrigerant is delivered to a downstream side, a valve hole through which the inlet port and the outlet port communicate with each other, an insertion hole formed coaxially with the valve hole, and a downstream-side passage intersecting at right angle with the valve hole and the insertion hole and through which the valve hole and the outlet port communicate with each other;
a valve element configured to move toward and away from the valve hole to close and open a valve section;
a drive unit provided on the body and configured to generate a drive force for opening or closing the valve section;
a shaft slidably extending through the insertion hole, having a first end connected to the drive unit and a second end connected to the valve element through the downstream-side passage and the valve hole, and being configured to transmit the drive force of the drive unit to the valve element; and
a plate member partially blocking a cross section of the downstream-side passage,
wherein the downstream-side passage includes a small-diameter part to which the valve hole and the insertion hole are open, and a large-diameter part to which a pipe leading to the evaporator is connected, and an annular part at a boundary between the large-diameter part and the small-diameter part,
wherein the plate member has a shape in which an outer periphery of the plate member on a side opposite to a projected position of the valve hole is in contact with the annular part and in which the plate member has plural surfaces forming an opening, angles being formed between adjacent ones of the plural surfaces of the plate member, the opening in the plate member providing access from the small-diameter part to the large-diameter part of the downstream-side passage, and
wherein the outer periphery includes a part fixed to the annular part on the side of the projected position of the valve hole relative to a center of the annular part by a contact surface pressure in the radial direction.

11. An expansion valve for use in a refrigeration cycle, for throttling and expanding a refrigerant flowing from an upstream side and supplying the expanded refrigerant to an evaporator, the expansion valve comprising:
a body having an inlet port through which the refrigerant is introduced from the upstream side, an outlet port through which the refrigerant is delivered to a downstream side, a valve hole through which the inlet port and the outlet port communicate with each other, an insertion hole formed coaxially with the valve hole, and a downstream-side passage intersecting at right angle with the valve hole and the insertion hole and through which the valve hole and the outlet port communicate with each other;
a valve element configured to move toward and away from the valve hole to close and open a valve section;
a drive unit provided on the body and configured to generate a drive force for opening or closing the valve section;
a shaft slidably extending through the insertion hole, having a first end connected to the drive unit and a second end connected to the valve element through the downstream-side passage and the valve hole, and being configured to transmit the drive force of the drive unit to the valve element; and
a wall member provided in the downstream-side passage,
wherein the downstream-side passage includes a small-diameter part to which the valve hole and the insertion hole are open, and a large-diameter part to which a pipe leading to the evaporator is connected,
wherein the wall member has a shield part partially covering a downstream end of the small-diameter part, the shield part having a height of 2 mm or larger in a radial direction of the small-diameter part from a projected position of an opening of the insertion hole at the downstream end of the small-diameter part and a width equal to or larger than a radius of the shaft, wherein the shield part of the wall member does not cover at least a range of projection of an opening of the valve hole at the downstream end of the small-diameter part,
wherein the wall member is a plate member, and
wherein the plate member has an undulating surface over at least a portion of the periphery thereof, the undulating surface having a plurality of crest portions which contact the large-diameter part and a plurality of recessed portions spaced inwardly from the crest portions.

12. The expansion valve according to claim 11, wherein the large-diameter part has a fitting recess and the plate member is received in the fitting recess.

13. The expansion valve according to claim 11, wherein the wall member is provided so that an opening area at the downstream end of the small-diameter part is 20 mm$^2$ or larger.

14. The expansion valve according to claim 11, wherein the wall member is provided so that a circumferential edge of a downstream end of the small-diameter part on a side of the projected position of the valve hole is not covered by the shield part but open at least over a semicircular arc or larger.

15. The expansion valve according to claim 11, wherein the plate member is disposed at a boundary between the large-diameter part and the small-diameter part, and the shield part is defined by a shape and a position of the plate member.

16. The expansion valve according to claim 15, wherein the plate member is positioned so that the plate member has a greater area towards the projected position of the insertion hole relative to any other part of the downstream end of the small-diameter part.

17. The expansion valve according to claim 15, wherein in the downstream-side passage, a distance between an axial position of the shaft and an end position of the small-diameter part is larger than a distance between the axial position of the shaft and the plate member.

18. The expansion valve according to claim 15,
wherein an outer periphery of the plate member is fixed to an annular part formed at the boundary between the large-diameter part and the small-diameter part by a contact surface pressure in the radial direction.

19. The expansion valve according to claim 18, wherein the outer periphery of the plate member has a part with a shape in contact with the annular part on a side opposite to the projected position of the valve hole, and
wherein the crest portion of the plate member is fixed to the annular part by contact surface pressure on a side of the projected position of the valve hole relative to a center of the annular part.

20. The expansion valve according to claim 18, wherein the wall member is provided so that an opening area at the downstream end of the small-diameter part is 20 mm$^2$ or larger,
wherein the outer periphery of the plate member has a part with a shape in contact with the annular part on a side opposite to the projected position of the valve hole, and
wherein the outer periphery includes a part fixed to the annular part by a contact surface pressure on a side of the projected position of the valve hole relative to a center of the annular part.

* * * * *